June 2, 1953  I. J. FINK ET AL  2,640,253
AUTOMATIC METALWORKING MACHINE
Filed Dec. 22, 1950  4 Sheets-Sheet 1

INVENTORS
*Israel J. Fink*
BY *William V. McNeely*
ATT'YS

June 2, 1953     I. J. FINK ET AL     2,640,253
AUTOMATIC METALWORKING MACHINE

Filed Dec. 22, 1950     4 Sheets-Sheet 2

INVENTORS
Israel J. Fink
William V. McNeely
BY Murray, Sachhoff & Murray
ATT'YS

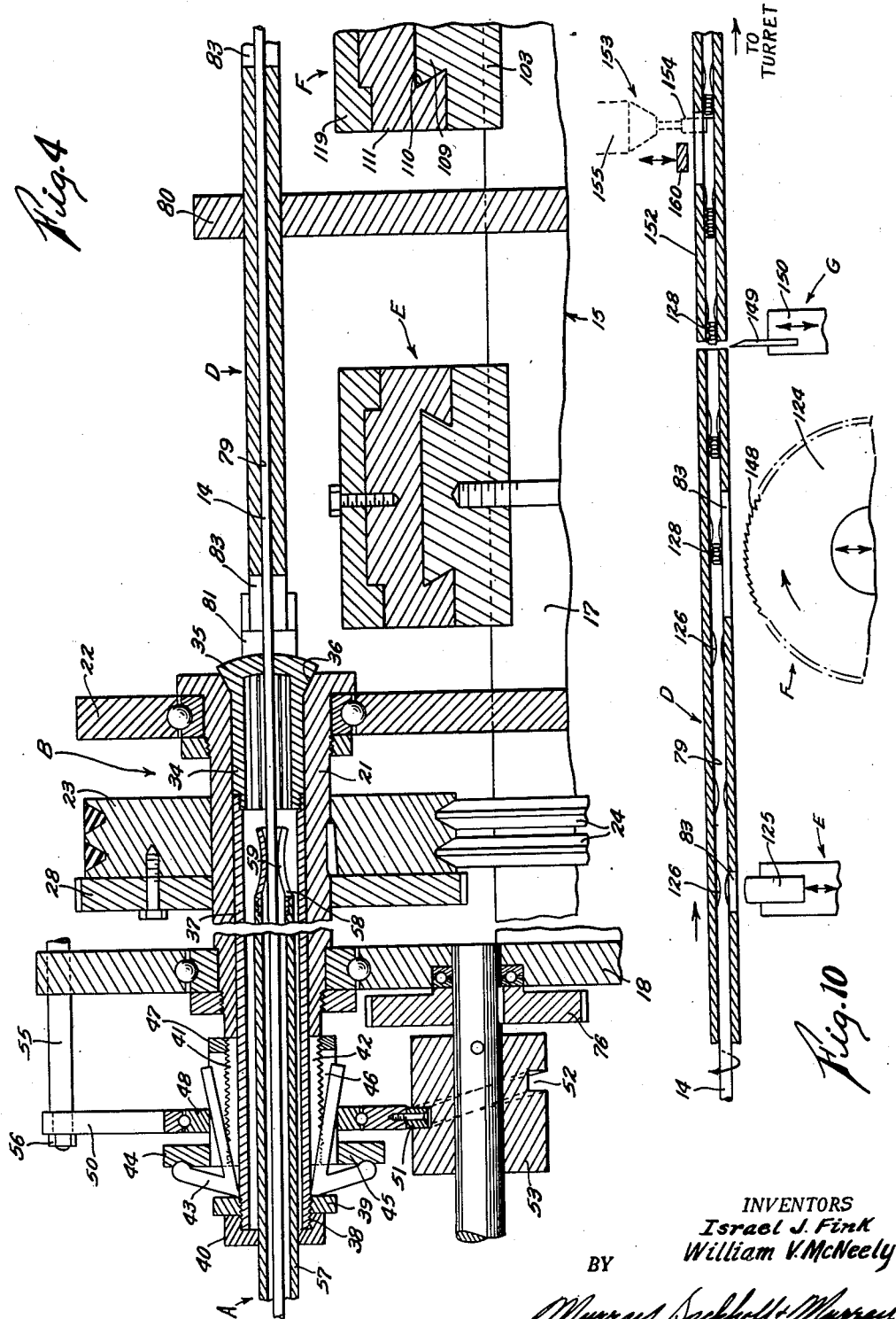

INVENTORS
Israel J. Fink
William V. McNeely
BY
ATT'YS

Patented June 2, 1953

2,640,253

UNITED STATES PATENT OFFICE 2,640,253

AUTOMATIC METALWORKING MACHINE

Israel J. Fink and William V. McNeely, Cincinnati, Ohio

Application December 22, 1950, Serial No. 202,327

10 Claims. (Cl. 29—27)

This invention relates to a machine tool and is particularly directed to an automatic multiple station machine which is adapted for continuous operation. In a more specific aspect the present invention relates to a machine for producing accurately finished dental burrs from straight bar stock or rods in an efficient manner and a minimum of time.

Among the objects of this invention are to provide in a machine of the character described a means for intermittently advancing bar stock axially therethrough, periodically rotating it on its axis during dwell periods of the advancing means, and providing a series of forming mechanisms for the machine that are positioned beside the path of stock movement and adapted for simultaneous actuation during said dwell periods to perform a sequence of forming operations on the bar stock before it is severed by a suitable mechanism into separate work pieces.

Another object of the invention is to provide an entirely automatic machine which requires only the insertion of bar stock and the removal of a hopper containing the finished product.

It is a further object of the invention to provide an automatic machine which intermittently feeds stock therethrough and has a pair of spaced axially aligned spindles and associated stock chucks, with an axially positioned stock engaging tube therebetween, said spindles and tube cooperating to rotatably position the stock for sequential forming operations by a plurality of mechanisms carrying different tools that are positioned along the tube and are fed laterally against spaced portions of the stock at timed intervals between stock feeding operations.

It is another object of the invention to provide in a screw machine a pair of spaced spindles which are automatically adapted to alternately chuck and unchuck a piece of straight bar stock in unison, said machine having stock advancing means that is made operative during unchucked spindle condition, and a series of tools positioned adjacent the stock and between the spindles and actuated during chucked condition of the spindles to perform a series of milling and/or cutting operations on the bar stock.

Another feature of this invention resides in the provision of a thread chasing cross slide which has a toothed cutter rotatably mounted thereon on an axis normal to the bar stock, said bar stock being rotated on its axis in timed relation with the cutter as the latter is fed laterally against a portion of said stock to form a thread therein.

With these and other objects in view the present invention consists in certain features of novelty in the construction, combination, and arrangement of parts by which the said objects and certain of the other objects are attained, all as fully described in the accompanying drawing and the following specification, and more particularly pointed out in the appended claims.

With reference to the accompanying drawings wherein the same reference numeral indicates similar parts throughout the several views, and wherein:

Fig. 4 is an enlarged central section taken longitudinally through one spindle and chuck for the machine.

Fig. 10 is a diagrammatical view illustrative of the sequence of forming operations on a piece of straight bar stock fed axially through the machine depicted in Figs. 1–8.

Figure 1:
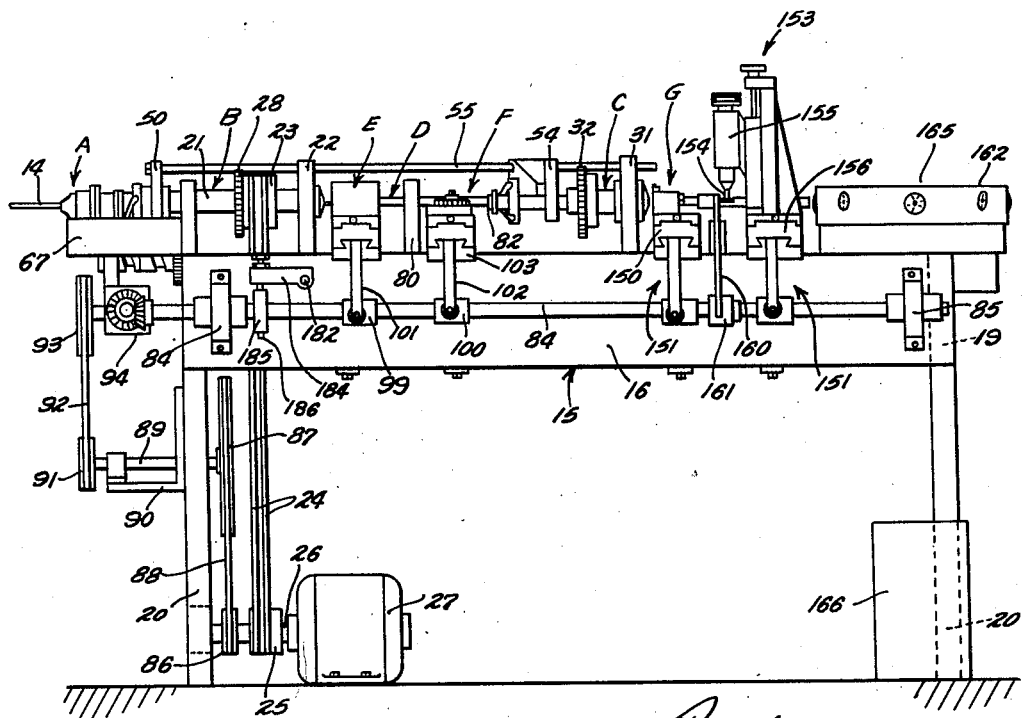
Fig. 1 is a side elevational view of the complete machine tool, with the motor for the milling cutter removed.

According to the present invention a straight piece of bar stock 14 is fed axially through the machine by an intermittently actuated feed-out device A. The stock is fed through a pair of spaced, rotating spindles B and C, each having a chuck associated therewith and both actuated during intermittent dwell periods of the stock feed-out device to engage and rotate the stock. That portion of the stock that extends between the spindles B and C is carried in a stock support tube D which is perforated or notched along its longitudinal extent to permit entrance of certain tools thereinto for forming operations on the stock. The tools are mounted on cross slides that are synchronized with the stock feed-out device and the actuating means for the spindle chuck, to feed and return said tools relative to the stock during rotating periods of the stock.

In a limited sense the present invention is embodied in a machine for making dental burrs and as such the letter E represents a cross slide carrying a tool for turning a neck for the burr, whilst the letter F indicates a cross slide which carries a tool for hobbing an external thread in the burr head. These tools are operative during the time intervals when the chucks are operative and during the inoperative intervals of the feed-out devices, and it will be noted that a plurality of different forming operations are made on a single piece of bar stock 14 as it is periodically rotated on its axis between axially directed, intermittent advancing movements through the machine, and that said stock remains in one piece during all of said operations until it is severed into lengths at station G, situated beyond the spindles with reference to direction of stock movement.

Referring more in detail to the particular construction of the machine shown in the accompanying drawings, the machine has a frame 15 comprising two spaced, longitudinal members 16 and 17 connected at their ends by cross members 18 and 19, said frame being supported at each of its corners by a leg 20. The frame supports a pair of spindles B and C which are disposed thereon in axially aligned positions, and, as the two spindles are identical in structure and functions, it will only be necessary to describe one of them. The forward spindle B is best shown in Fig. 4 and has a spindle sleeve 21 journaled at one end in a bearing block 22 that has its base portion extending between, and welded to the members 16 and 17. The other end of the spindle is journaled in that portion of the frame cross member 18 which extends upwardly above the level of the members 16 and 17.

Figure 2:
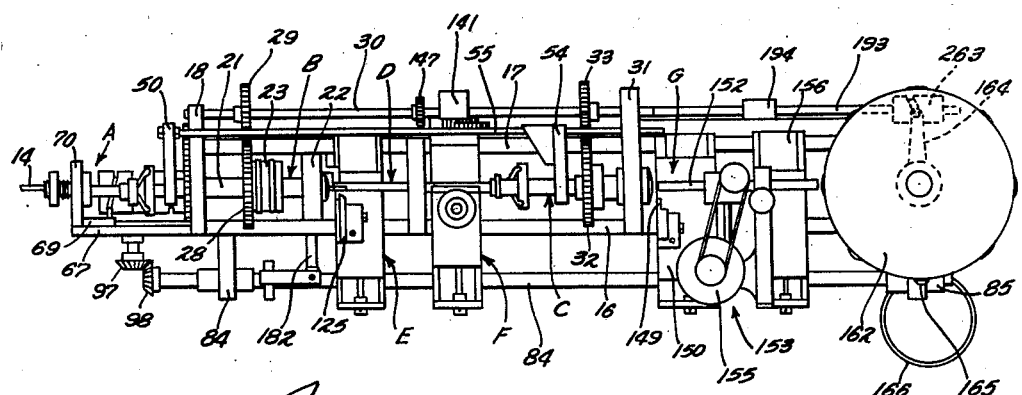
Fig. 2 is a top plan view of the machine shown in Fig. 1.

The power drive for the spindles B and C is continuous and comprises a sheave 23 keyed to the spindle sleeve 21 and engaging belts 24 which run on a pulley 25 fixed to a rotor shaft 26 of an electric motor 27 (Fig. 1). An interconnecting drive is provided between the spindles B and C so that they rotate in unison, and as most clearly illustrated in Figs. 2, 4 and 5, the sheave 23 has a gear 28 bolted to it which meshes with a gear 29 fixed on a longitudinal shaft 30 journaled in the cross member 18 and in a bearing block 31 that is mounted upon the frame members and carries the spindle C. As illustrated in Figs. 1 and 2 the spindle C has secured thereto a gear 32, which meshes with a gear 33 that is also fixed to the shaft 30.

A chuck 34 is slidably mounted in the rearward end of the spindle sleeve with respect to the movement of the stock 14 through the machine, and said chuck is provided with a tapered head 35 that is positioned in a tapered seat 36 formed in the said end of the sleeve. The chuck is externally threaded at its inner end for engagement with a chuck sleeve 37 which extends forwardly beyond the sleeve where it terminates in a threaded end 38 for engagement with a nut 39 which is locked in a longitudinal adjusted position by a cap nut 40. The end of the spindle sleeve is externally threaded at 41 and also provided with a number of longitudinal slots 42 to receive a circular row of L-shaped chuck levers 43. The outer ends of the levers bear against a flange 44 formed on a hub 45 which is threaded to the spindle sleeve end, said hub having a number of slots 46 formed therein positioned in alignment with the slots 42 in said sleeve. The hub is fixed on the sleeve by a suitable lock nut 47 threaded on the sleeve and bearing against the forward end of the hub.

The means for periodically closing the chuck for the spindle B comprises a sliding sleeve 48 that encircles the hub 45. When said sleeve is moved longitudinally to the right, as illustrated in Fig. 4, it rocks the chuck levers around their pivot points at the base of the chuck nut 39 to thereby draw the chuck sleeve 37 into the spindle sleeve 21, which in turn forces the chuck head into its tapered seat so that it is compressed to grip the bar stock 14. As has been said the spindle 21 is continuously rotated and the periodic gripping of the bar stock by the chuck locks the stock 14 to the spindle 21 so that said stock is rotated with the spindle when the chuck is periodically closed. With reference to Fig. 4 it will be noted that the chuck sleeve 48 is journaled in a chuck operating plate 50 which has a cam roller 51 mounted beneath it for engagement in a circular track 52 formed in a chuck actuating, barrel cam 53. The chuck operating plate 50 for the spindle B is connected to a chuck operating plate 54 for spindle C by a longitudinal rod 55 secured to the plate 50 by a nut 56 and welded to the plate 54, said rod being suitably mounted for sliding movement in aligned bores formed in the end plate 18 and in the block 31.

Figure 3:
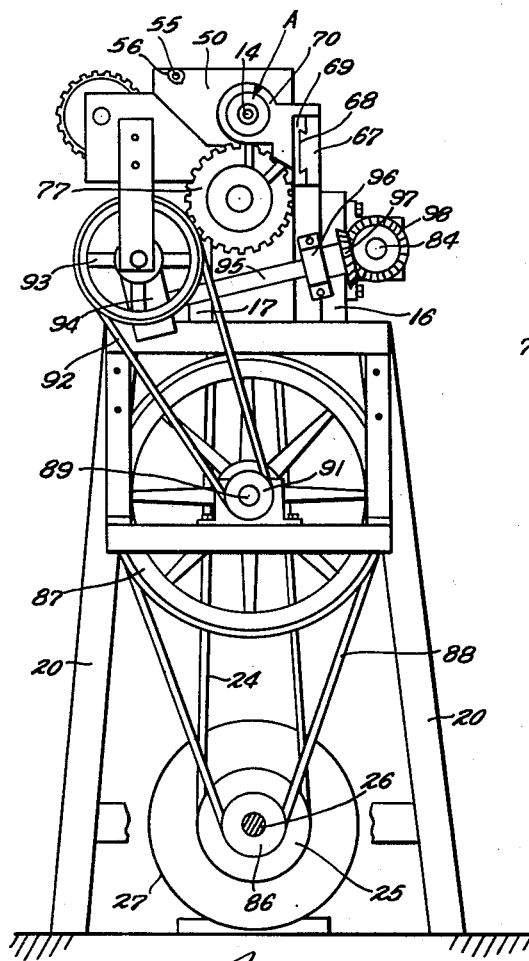
Fig. 3 is a rear elevational view of said machine.
Figure 8:
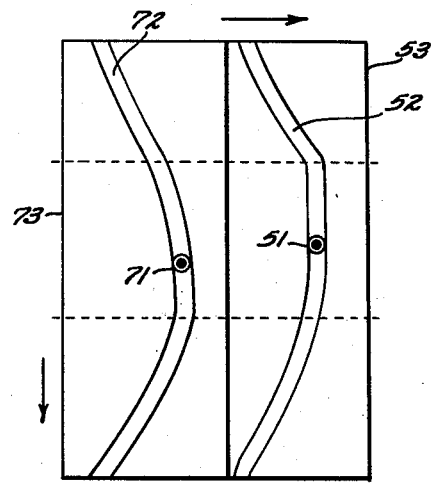
Fig. 8 is a side-by-side development of the stock feed-out and chuck operating cams for the machine.
Figure 7:
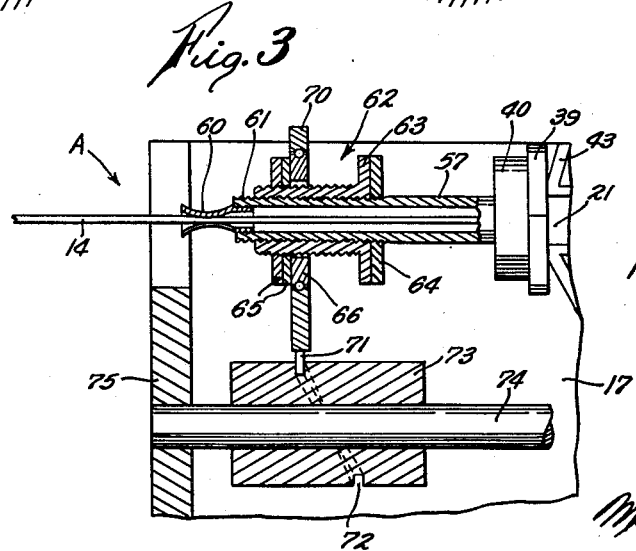
Fig. 7 is a central section taken longitudinally through the stock feed-out device for the machine.

The intermittently actuated stock feed-out device for the machine is operative during chuck inoperative periods and is associated with the spindle B. As shown in Fig. 4 the device comprises a feed tube 57 slidably positioned within the chuck sleeve 37 and extending forwardly through and beyond the end cap 40 for said sleeve. The end of the feed tube within the spindle is internally threaded to receive the threaded end of a stock feeding head 58 which has a number of spring fingers 59 that grip portions of the stock passing through the tube. As shown in Fig. 7 the exposed end of the feed tube has another feeding head 60 secured thereto for gripping the stock, said end being externally threaded at 61 to receive a boss 62. The boss has a flanged end 63 which is backed against a set nut 64 for locking the boss in longitudinally adjusted positions on the feed tube. The boss is also externally threaded to mount a pair of nuts 65—65 which provide the flange with an adjustable lost motion space therebetween for receiving a cam operated, feed tube actuating sleeve 66. As most clearly shown in Figs. 1, 2 and 3 a slide support member 67 is welded to the frame cross member 18 and has a dove tail guide 68 formed on its inner face. A block 69 is positioned for sliding movement on the member and has a plate 70 extending laterally therefrom in which is journaled the feed tube actuating sleeve 65. With particular reference to Figs. 3 and 8 the plate 70 has a roller 71 secured to its lower edge which is received in a sinuous, circular track 72 formed in a stock feed-out barrel cam 73.

The barrel cams 53 and 73 are fixed on a common shaft 74 journaled at its forward end in a cross member 75 (Fig. 7) and having its opposite end journaled in the cross member 18 (Fig. 4). The shaft is driven by a gear 76 keyed thereto which meshes with a gear 77 (Fig. 5) forming a part of a lead clutch mechanism for the machine, which is generally indicated by the numeral 78 in Fig. 5 and will be described in detail hereafter.

The stock support tube D extends between the spindles B and C and is provided with a through bore 79 of a diameter to snugly receive the stock and permit it to rotate in and to slide axially therethrough. The tube is fixed on the frame 15 by a block 80 and has its rearward end secured to the block 22 by a suitable bracket 81. As illustrated in Fig. 4 the forward tube end is in axial alignment with the stock opening in the chuck 35, and as best shown in Fig. 1, the opposite end of the tube is freely received in a bronze bushing in the forward end of the spindle C. The tube is perforate and has spaced notches 83 formed in its side to permit entrance of certain forming tools therein for operation on exposed portions of the stock.

A continuously operated cross slide cam shaft 84 extends along one side of the machine and is mounted thereon in spaced journal bearings 84 and 85 bolted to the frame member 16. The cam shaft is driven from the motor 27 by a pulley 86 fixed on the motor shaft 26, and driving a wheel 87 journaled in a frame work 90 mounted on the forward machine legs 20, said shaft 89 having a pulley 91 fixed at its opposite end which engages a belt 92 that in turn drives a pulley 93. The pulley 93 is fastened on a lead shaft 193 which passes through a change speed gear box 94 and extends along the entire length of the machine. A shaft 95 is driven from the box and extends laterally across the machine where it is journaled in a bearing 96 and has a bevel gear 97 fixed to its outer end which engages a bevel gear 98 secured to the forward end of the cross slide cam shaft 84. The gear box is adapted to reduce the speed of rotation of the cross slide cam shaft 84 so that its ratio with respect to the speed of rotation of the lead shaft 193 is about 36 to 1.

Figure 6:
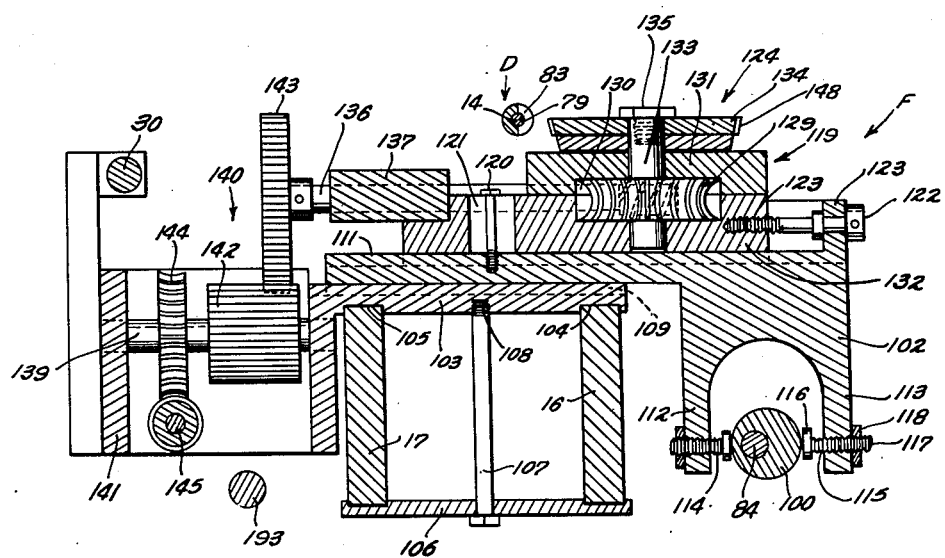
Fig. 6 is a section taken on line 6—6 of Fig. 5.

The means for operating the cross slides E and F in unison from the cross slide cam shaft comprises a pair of eccentric cams 99 and 100 fixed to said shaft and engaging followers 101 and 102 for the slides E and F respectively. As the cross slides have the same general structure a description of the cross slide F carrying the hobbing tool will suffice for a clear understanding of the structure of the other cross slides for the machine. With reference to Fig. 6 the numeral 103 indicates a fixed slide block notched at 104 and 105 to receive the upper edges of the frame members 16 and 17 respectively. The block is clamped on the members by a bar 106 positioned beneath the members and having a central bore therein to receive a draw bolt 107 which is threaded in the block 103 at 108. The upper face of the block 103 has a dove tail spline 109 therein which slidably engages a groove 110 formed in a slide 111. The slide has the follower 102 formed integral therewith and depending from its free end, said follower terminating in a pair of spaced legs 112 and 113 which straddle the eccentric cam 100. Each leg 112 and 113 has an adjustable follower 114 and 115 respectively extending toward and engaging the cam face, each follower having a head 116 and a shank 117 threaded in the leg, a nut 118 being provided for the shank to lock the head in adjusted position. Lateral adjustments of the followers 114 and 115 relative to the eccentric cam, controls the depth of cut of the slide tools and the length of feed and return movement imparted to the slide by the eccentric cam. A tool carrying member 119 is mounted upon the slide in a predetermined lateral position by a set screw 120 threaded in the slide 111 and extending through a lateral slot 121 formed in the plate 119. Lateral adjustment of the plate on the slide is made by a micrometer screw 122 rotatably mounted against axial displacement in a boss 123 formed on the follower 102 and having a threaded engagement at 123 in the plate.

Figure 9:
Fig. 9 is an enlarged, side elevation of a finished dental burr made on the machine.

The slide F differs from the slide E in that the former carries a rotary tool 124 whereas the tool in slide E is stationarily mounted on the slide plate. With respect to slide E the tool carried thereby is a turning tool 125 which forms a neck portion 126 of a dental burr 127 (Fig. 9). The rotary tool 124 for the slide F chases a thread 128 in spaced portions of the stock that serves as the head of the finished burr 127, said tool being driven by a pinion 129 rotatably mounted in a circular recess 130 formed between sections 131 and 132 of the tool carrying member 119. The pinion has a stub shaft 133 which extends above the section 131, the latter having a hobbing cutter 134 keyed to its free end and secured thereon by a bolt 135. A worm shaft 136 is journaled between the sections and in a block 137 positioned on the slide, the inner end of said shaft having fixed to it a worm 138 that meshes with the pinion 129.

The shaft 136 is driven from a cross shaft 139 by means of a side gear connection 140. The cross shaft is journaled at its ends in a rectangular frame 141 formed integral with the stationary slide block 103, said shaft carrying a wide gear 142 which meshes with a gear 143 fixed to the shaft 136. The shaft 139 carries a pinion 144 which is driven by a worm shaft 145 journaled in the frame 141, said shaft having a gear 146 fixed to it that meshes with a gear 147 keyed to the longitudinal spindle co-ordinating shaft 30.

With reference to Figs. 6 and 10 it will be noted that the rotary tool 124 has a row of cutting teeth 148 formed in its periphery and that the tool is rotated in timed relation with the rotation of the spindles B and C by the positive gear train between the spindle coordinating shaft 30 and the rotary cutting tool 124. There are preferably 360 teeth in the rotary tool and the gear reduction ratio between the spindles and the cutter is such that the shaft turns through 1° whilst the spindles rotate 360°. When the rotary tool 124 is fed into the rotating work by the cross slide 111 a thread is chased in the stock by the longitudinal movement of the tool teeth 148 relative to the work which is fixed against longitudinal movement and is rotating upon its axis. The thread chased in the stock may be somewhat convexed because of the circular form of the cutter teeth but this form of thread is not objectionable in burrs and may be largely overcome by employing a cutter of relatively large diameter with respect to the length and depth of the threaded portion made in the stock.

After the threaded head portions and the necks are formed in the stock it is advanced to a stock cut off station G where the stock is severed near the end of the threaded portions opposite the necks 126. The severing operation is performed by a cutting tool 149 mounted upon a cross slide 150 that is operated by a cam and follower arrangement 151 from the cross slide cam shaft 84. The burrs that are severed from the stock are entered in and are pushed through a fixed tube 152 in end-to-end relationship, said tube being positioned in axial alignment with the tube D for the straight bar stock. The severed burrs are intermittently fed past a milling station generally indicated by the numeral 153 in Figs.

1, 2 and 10. The milling tool 154 and its motor 155 are mounted upon a cross slide 156 which is driven from the cross slide cam shaft 84 by a cam and follower mechanism 157. As best shown in Fig. 10 the tube is provided with a slot 158 for entrance of the milling tool 154 into the tube for a milling operation on the burr end for the purpose of forming a flat 159 on the shank of the finished burr. Each burr must be clamped in the tube during this milling operation and to this end a clamp lever 160 is pivotally mounted on the machine frame and is rocked into clamping and unclamping condition with the burr during feed and return movements respectively of the milling tool slide 156 by means of a cam 161 fixed to the cross slide cam shaft 84 and engaging one end of the pivoted lever 160.

The tube 152 terminates adjacent the periphery of a turret 162 which is adapted to mill a series of longitudinal grooves 163 in the threaded head 128 of the burr 127. This turret forms no part of the present invention and is shown and described in the co-pending application of Israel J. Fink, Serial Number 90,328, filed on April 29, 1949, and now abandoned. Briefly, rotation of the turret 162 is synchronized with the functions of the screw machine by means of a barrel cam 263 (Fig. 2) driven by the lead shaft 193 for the machine, through a suitable gear reduction box 194 (Fig. 2). The barrel cam oscillates a lever 164 which is connected to the turret by an intermittently actuated clutch to periodically advance the turret a station at a time during dwell periods of the stock feed-out device for the machine. As fully set forth in the said application of Israel J. Fink there is a means made operable by the advancing movement of the turret for indexing the work holders relative to individual tools mounted on the turret adjacent each holder, the return movement of the oscillating lever 164 during turret dwell periods being adapted to advance and return the tools relative to the work to effect the milling of the grooves 163 in the burrs. The turret also has means for ejecting the work at station 165 so that the completed dental burr falls into a hopper 166.

Figure 5:
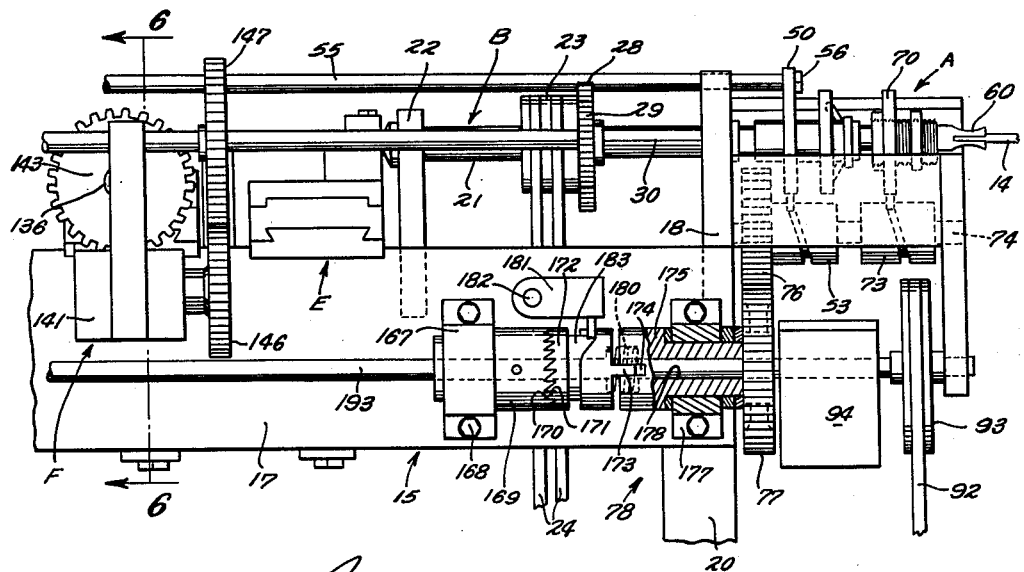
Fig. 5 is an enlarged, elevational view showing a portion of the reverse side of the machine as it is illustrated in Fig. 1, parts thereof being broken away, and other parts shown in central section.

The means for synchronizing the alternately operable feed-out device and the spindle chucks with the simultaneous movements of the tool slides comprises the lead clutch 78 controlled from the cross slide cam shaft 84 and operable to periodically transmit motion from the continuously rotating lead shaft 193 to the barrel cams 53 and 73 for the spindle chucks and feed-out device respectively. With particular reference to Figs. 1 and 5 the numeral 167 indicates a bearing block in which the lead shaft 193 is journaled, said block being secured to the frame member 17 by bolts 168. The shaft 193 has fixed to it a clutch element 169 having teeth 170 therein for cooperation with teeth 171 in a second clutch element 172 rotatably and slidably mounted on the shaft 193. The element 172 has a tongue 173 projecting from the end opposed to the teeth and slidably received in a groove 174 formed in a hub 175 journaled in a bearing block 177. The hub has a central bore 178 for journaling the shaft 193. This hub 175 has fixed to it the gear 77 which meshes with the gear 76 for the barrel cams 53 and 73. The second clutch element 172 is biased into clutching engagement with element 169 by an expansile, spiral spring 180 encircling the shaft 169 and bearing against element 172 and the hub 175.

The means for tripping the clutch so that the clutch elements engage and make one revolution with the lead shaft 193 comprises a dog 181 mounted on a lateral shaft 182 which is pivoted in the frame members 16 and 17. As illustrated in Fig. 5 this dog has a pin which cooperates with a cam track 183 for disengaging the teeth 170 and 171 to render the clutch inoperative. As shown in Fig. 5 the dog pin is just entering the caming portion of the track 183 to disengage the teeth of the clutch elements 172 and 175.

The lateral shaft 182 extends through the frame members and as illustrated in Fig. 1 this cam shaft has a trip arm 184 fixed to its end which engages a cam 185 fixed on, and rotated by the cross slide cam shaft 84. The cam has a pin 186 extending from its periphery which comes in contact with the arm 184 and momentarily raises it to thereby raise the pin on the clutch dog 181 out of the cam track 183 which puts the clutch element 172 under the influence of the spring to move its teeth 171 into engagement with the teeth 170 of clutch element 169. The clutch teeth will be engaged for one revolution of the elements during which time the pin rides upon the cylindrical surface of the element 172 until the pin on the dog falls into the cam track 183 (Fig. 5) and the cam pushes the element 172 away from element 169 to disengage the clutch.

In operation therefore, it will be noted that rotary motion is transmitted from the motor 27 to the cross slide cam shaft 84 and to the lead shaft 193 so that they are rotated continuously during the operation of the machine but at different speeds, it being presently advisable to have the lead shaft rotate about thirty-six times as fast as the cross slide cam shaft. The spindles B and C for the machine are also rotated in unison through a pulley belt drive connection with the motor 27. Work in the form of straight bar stock 14 is fed into the feed-out device A, said feed-out being intermittently actuated to periodically advance the bar stock through the machine. As shown in Fig. 5 the feed-out device is operated by the barrel cam 73 driven from the lead shaft 193 through the one revolution clutch 78. The work chuck 34 and its spindle B and the similarly constructed work chuck and spindle C are simultaneously operated during periodic dwell periods of the stock feed-out device by a barrel cam 53, which is rotated in unison with the feed-out barrel cam 73 by the one revolution clutch 78. As best shown in Fig. 8 the horizontal arrow indicates the direction of feed for the stock, whilst the vertical arrow indicates direction of rotation of the cams 53 and 73. In this respect and with reference to the upper ⅓ portions of the developments for the said cams, the tracks 72 and 52 indicate that the stock feed-out cam is operative to advance the stock during the said interval and that the work chucks are inoperative during their stock advancing period. The central portion of the cams shows the cam tracks effective to complete the work advancing operation and the chucks operative to clamp the work in the rotating spindles. During the last phase of cam revolution as indicated by the lower third portion of the cam developments in Fig. 8 the work feed-out is returned to a position to initiate a work advancing step by cam 53, whilst the spindle chucks will be rendered inoperative by the cam 73.

As indicated in Fig. 8 the rest position of the cams 53 and 73 is indicated by an arrow and notation. As the cams are driven at the speed of the lead shaft 193 and said lead shaft speed is about thirty six (36) times as fast as the cross slide cam shaft it will be understood that the barrel cams will complete their cycle in 1/36 of a revolution of the cross slide cam shaft. The barrel cam followers thus are at rest in the positions shown in Fig. 8 for the greater part of each revolution of the cross slide cam shaft and as such maintain the chucks in operative position to rotate the stock and to hold the stock feed-out device in inoperative position, whilst the cross slides are operated by the cross slide cam shaft and the eccentrics thereon. The eccentric cams on the cross slide cam shaft are positioned on the shaft so that they feed their respective slides simultaneously against the stock and are furthest from the work when the one revolution clutch takes over to advance the stock through the machine by rendering the spindle chucks inoperative.

During the interval that the cross slides E, F, G and 153 are operative to feed and return the tools relative to the rotating stock, the cross slide cam shaft also makes the work clamp 160 effective to clamp the dental burrs in the tube 152 so that a flat 159 may be made therein by the milling tool 154. During this period also the turret 165 is rotated one station so that an empty chuck will be in axial alignment with the end of the tube 152 to receive a burr therefrom.

As most clearly shown in Fig. 10 the bar stock is fed into the tube D that extends between the spindles B and C, and slide E carries a turning tool 125 which forms a series of neck portions 126 in the stock as it is advanced through the machine. The slide F carries the hobbing wheel 124 and as this tool is fed into the work it chases a thread in the stock adjacent each neck, said threaded portion serving as the head 128 on the finished burr. As the stock with the series of heads and necks formed thereon, passes from tube D to tube 152 it is positioned adjacent the cross slide G, where it is severed into separate burrs 127, said burrs being thereafter moved through the tube 152 past a milling station 153. This milling station is provided with a clamp 160 which holds the dental burr to be operated on in the tube, whilst the milling tool 154 traverses the shank and mills a flat therein. After the burrs pass through the milling station 153 they are fed into the work collets of the turret 162 where a series of grooves 163 are formed in the dental burr heads before the finished burrs are ejected from the turret into the hopper 160.

What is claimed is:

1. In a machine of the class described a frame, a work spindle journaled on the frame, a work chuck for the spindle, a work receiving, perforate tube fixed on the base in axial alignment with the chuck, a tool cross slide mounted on the frame in lateral alignment with a perforation in the work tube, means for alternately actuating and releasing the work chuck, means for advancing the work through the tube during the inoperative periods of the work chuck, and means for feeding and returning the tool cross slide relative to the work during actuation of the work chuck.

2. In a machine of the class described a frame, a pair of work spindles journaled on the frame in axial alignment, power means for continuously rotating the spindles in unison, a work chuck for each spindle, a work receiving, perforate tube positioned on the frame between the spindles in axial alignment with the work chucks, a tool cross slide mounted on the frame adjacent a perforation in the work tube, means for alternately actuating and releasing the work chucks, means for advancing the work through the chucks and the tube during the released periods of the chucks, and means for feeding and returning the tool cross slide relative to the work in the tube during actuation of the work chucks.

3. In a machine of the class described a frame, a pair of work spindles journaled on the frame in axial alignment, a work chuck for each spindle, a work supporting tube positioned on the frame between the spindles and in axial alignment with the chuck feed-out means for advancing the work axially through the chucks and the tube, a plurality of tool cross slides mounted in spaced positions on the frame along the longitudinal extent of the work supporting tube, a cross slide cam shaft journaled in the frame and adapted to feed and return the tool cross slides in unison relative to the work, a tool entrance slot formed in the tube in transverse alignment with the tool on each slide, power means for rotating the shaft, means for simultaneously releasing the work chucks and actuating the feed-out means, and control means associated with the cross slide cam shaft for periodically actuating the last mentioned means during dwell periods of the tool cross slides.

4. In a machine of the class described a frame, a pair of work spindles journaled on the frame in axial alignment, power means for continuously rotating the spindles in unison, a work chuck for each spindle, a first work receiving, perforate tube positioned on the frame between the spindles in axial alignment with the work chucks, an intermittent feed-out means for advancing the work through the chucks and the tube, a second work receiving, perforate tube positioned on the frame adjacent to and in alignment with one end of the first work tube, a series of tool carrying, cross slides mounted on the frame adjacent the perforation in each tube, a cross slide disposed on the frame in lateral alignment with the adjacent ends of the said tubes, a stock severing tool on said slide, and means for simultaneously feeding and returning all the slides during rest periods of the feed-out means.

5. In a machine of the class described a frame, a pair of work spindles journaled on the frame in axial alignment, power means for continuously rotating the spindles in unison, a work chuck for each spindle, a first work receiving, perforate tube positioned on the frame between the spindles in axial alignment with the work chucks, an intermittent feed-out means for advancing the work through the chucks and the tube, a second work receiving, perforate tube positioned on the frame adjacent to and in alignment with one end of the first work tube, a series of tool carrying, cross slides mounted on the frame adjacent the perforation in each tube, a cross slide disposed on the frame in lateral alignment with the adjacent ends of the said tubes, a stock severing tool on said slide, means for simultaneously feeding and returning all the slides during rest periods of the feed-out means, and a work clamp on the frame for successively engaging severed pieces of stock in the second tube to clamp them therein against rotation during individual forming operations thereon.

6. In a machine of the character described the combination of a frame, a perforate tube mounted on the frame, intermittently actuated stock feed-out means on the frame for advancing bar stock longitudinally through the tube, a spindle on the frame, a stock chuck for the spindle, means for periodically actuating the chuck during dwell periods of the stock feed-out means, a cross slide on the frame, a toothed cutter wheel mounted on the slide for rotatory movement on an axis normal to the movement of the bar stock through the tube, means for rotating the wheel in timed relation with the spindle, and means for feeding and returning the slide relative to the stock during said dwell periods of the stock feed-out means.

7. In a machine of the character described the combination of a tube for supporting a length of bar stock, feed-out means for progressively advancing the stock through the tube, a rotatable stock chuck operative during dwell periods of the feed-out means to rotate the stock, a cross slide positioned adjacent the tube, a toothed cutter wheel on the slide, means on the slide for rotating the cutter wheel in timed relation with the chuck, a slot formed in the tube in lateral alignment with the cutter wheel, and means for advancing and returning the slide relative to the tube to enter the cutter wheel through the slot to chase a thread in the exposed portion of the stock.

8. In a machine of the character described a fixed stock receiving tube, a series of cross slides positioned in longitudinal, spaced relation along the extent of the tube, a forming tool carried on each slide, a series of slots formed in the tube in lateral alignment with the tools, means for rotating the stock within the tube, periodically actuated feed-out means for advancing the stock through the tube, and means operative during dwell periods of the stock feed-out means to simultaneously advance the tools through their respective slots to portions of the stock exposed by the slots in the tube.

9. In a machine of the character described a frame, a fixed tube on the frame, a number of work pieces disposed in end-to-end relation within the tube, means for intermittently advancing the pieces axially and one length at a time through the tube, a periodically rotated turret fixed on the frame, a plurality of milling stations positioned on the turret, a radially extending work holder for each station, the end of the tube being disposed adjacent the periphery of the turret and in axial, work transferring alignment with each of a succession of work holders on the turret, when the turret is at rest, and means for periodically rotating the turret during dwell periods of the means for intermittently advancing the pieces whereby the advancing movement of the pieces in the tube feeds the end piece out of the tube and into an aligned work holder in the turret.

10. In a machine of the character described a frame, a pair of bar stock spindles journaled on the frame in axial alignment, power means for continuously rotating the spindles in unison, a bar stock chuck for each spindle, a tool cross slide mounted on the frame for stock forming traversing movements toward and away from one side of the bar stock held between the chucks, a stock support fixed on the frame and having a portion thereof disposed on the side of the stock opposed to the tool traversing side, means for alternately actuating and releasing the work chucks, means for advancing the bar stock through the work chucks and the stock support during the released periods of the chucks, and means for feeding and returning the tool cross slide relative to the work in the support during actuation of the work chucks.

ISRAEL J. FINK.
WILLIAM V. McNEELY.

References Cited in the file of this patent

UNITED STATES PATENTS

| Number | Name | Date |
|---|---|---|
| 2,377,383 | Slovak | June 5, 1945 |
| 2,555,616 | Swartz | June 5, 1951 |